United States Patent
Xia

(10) Patent No.: US 8,083,831 B2
(45) Date of Patent: Dec. 27, 2011

(54) LIGHTWEIGHT, ANTI-SCRATCH AND FRACTURE RESISTANT MATERIAL FOR USE IN THE MANUFACTURE OF JEWELRY

(75) Inventor: Zhijian Xia, N.T. (HK)

(73) Assignee: BTR Limited, N.T. (HK)

( * ) Notice: Subject to any disclaimer, the term of this patent is extended or adjusted under 35 U.S.C. 154(b) by 155 days.

(21) Appl. No.: 12/717,144

(22) Filed: Mar. 4, 2010

(65) Prior Publication Data

US 2011/0218093 A1   Sep. 8, 2011

(51) Int. Cl.
*C22C 29/00* (2006.01)
*B22F 3/12* (2006.01)

(52) U.S. Cl. .......... 75/241; 75/236; 75/240; 419/10; 419/13; 419/18; 419/32; 419/36; 419/39; 419/60

(58) Field of Classification Search .......... 75/236, 75/244, 40, 241; 419/10, 13, 18, 32, 36, 419/38
See application file for complete search history.

(56) References Cited

U.S. PATENT DOCUMENTS

| | | | | |
|---|---|---|---|---|
| 3,671,201 A | * | 6/1972 | Bergna | 75/238 |
| 3,684,463 A | * | 8/1972 | Koelbl | 75/236 |
| 4,046,517 A | * | 9/1977 | Soga | 428/539.5 |
| 4,514,224 A | * | 4/1985 | Nishigaki | 75/238 |

* cited by examiner

*Primary Examiner* — Roy King
*Assistant Examiner* — Ngoclan Mai

(57) ABSTRACT

The present invention relates to a lightweight, anti-scratch and fracture resistant material for use in manufacture of jewelry prepared by sintering a powered mixture consisting essentially of 20% by weight of titanium carbide, 25% by weight of tungsten carbide, 35% by weight of titanium nitride, and balance being a binder consisting essentially of nickel, molybdenum and cobalt.

4 Claims, No Drawings

LIGHTWEIGHT, ANTI-SCRATCH AND FRACTURE RESISTANT MATERIAL FOR USE IN THE MANUFACTURE OF JEWELRY

A lightweight, anti-scratch and fracture resistant material for use in the manufacture of jewelry.

BACKGROUND OF THE INVENTION

The present invention relates to a lightweight, anti-scratch and fracture resistant material for use in the manufacture of jewelry.

Traditionally, jewelry items such as finger rings are made of precious metals such as gold, silver and so forth. Such precious metals are malleable and it is easy to form the precious metals into different shapes. Jewelry designers may work with the precious metals easily to accommodate various designs. However, the malleability of such precious metals also renders the jewelry items easy to be deformed or damaged even during normal course of use by users.

To overcome such problems, the market has offered jewelry items made of hard materials such as tungsten carbide. Such materials indeed have a high hardness and render the jewelry items unscratchable. However, such materials also have a high density, making the jewelry items too heavy and thus uncomfortable to wear. More importantly, such materials have a low breaking resistance, making the jewelry items easy to break during normal course of use as well as during the manufacturing process when the semi-finished jewelry items are required to be grinded or polished.

BRIEF SUMMARY OF THE INVENTION

In view of the aforesaid disadvantages now present in the prior art, the present invention provides a lightweight, anti-scratch and fracture resistant material for use in the manufacture of jewelry.

To attain this, the present invention provides a lightweight, anti-scratch and fracture resistant for use in manufacture of jewelry prepared by sintering a powered mixture consisting essentially of 20% by weight of titanium carbide, 25% by weight of tungsten carbide, 35% by weight of titanium nitride, and balance being a binder consisting essentially of nickel, molybdenum and cobalt.

More preferably, the powdered mixture consists of 11% by weight of nickel, 5% by weight of molybdenum and 4% by weight of cobalt.

More preferably, the titanium carbide has a grain size of about 0.6 μm; the tungsten carbide has a grain size of about 1 μm; the titanium nitride has a grain size of about 1 μm; the nickel has a grain size of about 2 μm; the molybdenum has a grain size of about 2 μm; and the cobalt has a grain size of about 2 μm.

More preferably, the material is prepared by the following steps:

(a) mixing the powdered mixture in a tungsten steel ball mill in a proportion of 1 part of powdered mixture:4 parts of balls:0.5 part of alcohol with additional 1% of polyvinyl alcohol or other organic adhesive for 4 to 6 hours;

(b) drying the powdered mixture in a vacuum environment (e.g. a drying oven) at a temperature of 60° C. until the alcohol in the powdered mixture is reduced to less than 1% by weight;

(c) pressing the dried powdered mixture at a pressure greater than 800 MPa to form a pressed body;

(d) sintering the pressed body in a vacuum environment (e.g. a vacuum sintering oven) at a vacuum of $10^{-3}$ Pa and a temperature of 1380° C.-1460° C. for 20 to 24 hours and then slowly cooled back to atmospheric temperature for 2 hours to form the lightweight, anti-scratch and fracture resistant material for further processing.

DETAILED DESCRIPTION OF THE INVENTION

The present invention provides a lightweight, anti-scratch and fracture resistant material for use in the manufacture of jewelry which is prepared by sintering a powered mixture consisting essentially of 20% by weight of titanium carbide, 25% by weight of tungsten carbide, 35% by weight of titanium nitride, and balance being a binder consisting essentially of nickel, molybdenum and cobalt. In the embodiment as described herein, the powdered mixture consists of 11% by weight of nickel, 5% by weight of molybdenum and 4% by weight of cobalt. The titanium carbide has a grain size of about 0.6 μm; the tungsten carbide has a grain size of about 1 μm; the titanium nitride has a grain size of about 1 μm; the nickel has a grain size of about 2 μm; the molybdenum has a grain size of about 2 μm; and the cobalt has a grain size of about 2 μm.

In this embodiment, the material of the present invention is prepared by the following steps:

(a) mixing the powdered mixture in a tungsten steel ball mill in a proportion of 1 part of powdered mixture:4 parts of balls:0.5 part of alcohol with additional 1% of polyvinyl alcohol or other organic adhesive for 4 to 6 hours;

(b) drying the powdered mixture in a vacuum drying oven at a temperature of 60° C. until the alcohol in the powdered mixture is reduced to less than 1% by weight;

(c) pressing the dried powdered mixture at a pressure greater than 800 MPa to form a pressed body;

(d) sintering the pressed body in a vacuum sintering oven at a vacuum of $10^{-3}$ Pa and a temperature of 1380° C.-1460° C. for 20 to 24 hours and then slowly cooled back to atmospheric temperature for 2 hours to form the lightweight, anti-scratch and fracture resistant material for further processing.

The lightweight, anti-scratch and fracture resistant material prepared in this embodiment has a hardness value of 82.7HRA and a density of 7.2 g/cm$^3$. A finger ring of normal size made from the material of the present invention also survives a free fall from a height of 30 m onto a cement floor. The same tests are conducted on tungsten carbide based material commonly used for the manufacture of jewelry which comprises at least 50 percent to less than 85 weight percent tungsten carbide. Such tungsten carbide based material has a hardness value of 80.7 HRA and a density of 14.3 g/cm$^3$, and a finger ring of normal size made from such material could not survive a free fall from a height of over 10 m onto a cement floor. In view of the above test data, the material of the present invention has a similar hardness with existing tungsten carbide based material yet a much lower density (only about half of the existing tungsten carbide based material) and could survive a free fall from a height 3 times more than the existing tungsten carbide based material. In other words, the material of the present invention is unscratchable as existing tungsten carbide based material, yet exhibits better qualities of lightness and fracture resistance, thereby making jewelry items made from the material of the present invention harder to break during normal course of use as well as during the manufacturing process when the semi-finished jewelry items are required to be grinded or polished and providing jewelry wearers with greater comfort as the weight is reduced.

The above embodiment is a preferred embodiment of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A lightweight and scratch-resistant material for use in manufacture of jewelry prepared by sintering a powered mixture consisting essentially of 20% by weight of titanium carbide, 25% by weight of tungsten carbide, 35% by weight of titanium nitride, and balance being a binder consisting essentially of nickel, molybdenum and cobalt.

2. The lightweight and scratch-resistant material for use in manufacture of jewelry as in claim 1, wherein the powdered mixture consists of 11% by weight of nickel, 5% by weight of molybdenum and 4% by weight of cobalt.

3. The lightweight and scratch-resistant material for use in manufacture of jewelry as in claim 1, wherein the titanium carbide has a grain size of about 0.6 μm; the tungsten carbide has a grain size of about 1 μm; the titanium nitride has a grain size of about 1 μm; the nickel has a grain size of about 2 μm; the molybdenum has a grain size of about 2 μm; and the cobalt has a grain size of about 2 μm.

4. The lightweight and scratch-resistant material for use in manufacture of jewelry as in claim 1, wherein the material is prepared by the following steps:
  (a) mixing the powdered mixture in a tungsten steel ball mill in a proportion of 1 part of powdered mixture:4 parts of balls:0.5 part of alcohol with additional 1% of polyvinyl alcohol or other organic adhesive for 4 to 6 hours;
  (b) drying the powdered mixture in a vacuum environment at a temperature of 60° C. until the alcohol in the powdered mixture is reduced to less than 1% by weight;
  (c) pressing the dried powdered mixture at a pressure greater than 800 MPa to form a pressed body;
  (d) sintering the pressed body in a vacuum environment at a vacuum of $10^{-3}$Pa and a temperature of 1380° C.-1460° C. for 20 to 24 hours and then slowly cooled back to atmospheric temperature for 2 hours to form the lightweight, anti-scratch and fracture resistant material for further processing.

\* \* \* \* \*